Patented Sept. 29, 1942

2,297,549

UNITED STATES PATENT OFFICE 2,297,549

METHOD OF APPLYING CEMENT COATING

William V. Friedlaender, Chicago, Ill., assignor to Universal Atlas Cement Company, a corporation of Indiana No Drawing. Application August 18, 1941, Serial No. 407,355

8 Claims. (Cl. 117—54)

This invention relates to cement coatings or paints and, particularly, to an improved cement coating for surfaces, such as concrete surfaces, and especially cement asbestos surfaces and the like, and to an improved method of applying the same thereto.

Various types of cements, such as Portland and other analogous hydraulic cements, have been suggested and used for the coating of concrete work, stucco, masonry, shingles, etc. Such coatings usually consisted of a thin mixture of Portland cement and water, and were at times unsatisfactory in that they did not properly cover the surface to be coated and also hardened imperfectly.

If such cement mixtures were used for color coating cement surfaces, such as shingles, frequent defects, such as dullness in color and non-uniformity of color over the area coated, appeared after the coating had set and become hard, and often times white patches, called efflorescence, appeared.

Accordingly, it is the general object of the present invention to provide an improved cement coating for concrete surfaces and the like which is uniform and durable and one which will be properly bonded to the surface to which it is applied, whereby all of the above named disadvantages are eliminated.

It is another object of the invention to provide an improved cement or paint for concrete surfaces and the like which can easily and efficiently be applied thereto, and an improved method of applying the same.

It is a further object of this invention to provide an improved method of applying a cement coating to concrete surfaces, cement asbestos shingles and the like, which provides a coating thereon which is uniform in color and a coating which will not scale or effloresce.

It is a more specific object of the present invention to provide an improved coating for asbestos shingles and the like, whereby a shingle is obtained having an enhanced appearance and a coating is provided thereon which is more durable and uniform than any coating heretofore obtained, and to an improved method of applying the same thereto.

Various other objects and advantages of this invention will become more apparent during the course of the following specification and will be particularly pointed out in the appended claims.

According to the present invention, there is provided a cement coating or paint for use in coating concrete surfaces and the like, and particularly a coating for shingles made of Portland cement or other hydraulic cements, and asbestos. The cement coating comprises a fluid slurry consisting of a mixture of a suitable hydraulic cement, a mineral color material, when desired, an inorganic material to accelerate hardening, and water. It has been found that Portland cement may be used, but it is preferable that a calcium aluminate type of cement, such as Lumnite cement, be used, especially if it is desired to obtain a substantially black coating. The mineral color material is selected from the group consisting of green chromic oxide, and if a black coating is desired, it has been found that from 3 to 5 per cent of manganese dioxide may be satisfactorily used. Gypsum has been found to be most effective for use as the inorganic material for accelerating the hardening of the coating and also for improving viscosity characteristics of the slurry.

A suitable slurry is provided by using approximately from four to five parts by weight of gypsum, approximately from forty to forty-five parts by weight of water if calcium aluminate type of cement is used, or from fifty to sixty parts by weight of water if Portland or other type of hydraulic cement is used, depending on the nature and fineness of the cement and its natural water requirement to make a slurry of sprayable consistency, and about one hundred parts by weight of the mixture of cement and the mineral color. If a mineral coloring material is used, it is preferably mixed with the cement by grinding them together.

The natural setting time of Lumnite cement, being longer than four hours when mixed with water to normal consistency, is greatly extended when mixed with from forty to forty-five per cent of water. The usual time for such coatings to harden is about sixteen hours, and it has been found that if about five parts of gypsum to one hundred parts of Lumnite cement is used, hardening is assured within this time, and in most instances is reduced to a much shorter time.

The cement coating, according to the present invention, is applied to the surface to be coated in the following manner. The surfaces, or shingles, to be coated are first thoroughly saturated with water so that the body below the surface to be coated is thoroughly impregnated. However, any excess water remaining on the surface is removed therefrom after impregnation. The fluid slurry, as above described, is then applied to the surface or shingles by means of a brush or in any other suitable manner, but it has been found that better results are obtained by spraying the slurry thereon, as a more uniform and smoother coating is disposed on the surface thereby. Immediately after the fluid slurry or cement coating has been sprayed on the surface, it is preferable that it stand in the open air, usually for not more than ten minutes, until the film of water disappears therefrom, provided it is desired to obtain a dull-coated surface. However, if a relatively high gloss is desired, it is preferable that the film of water be permitted to remain on the surface. Promptly at this point, without allowing the slurry or coating to dry further, a thin film of oil is sprayed over the entire layer of cement coating. It has been found that mineral oil is most satisfactory, but any other suitable oil may be used. It will be understood that it is the purpose of this film of oil to prevent loss of water from the coating or slurry by evaporation and, further, to protect the slurry against droplets of liquid water during the subsequent period of curing, hereinafter to be described.

The coated surface or shingles are then placed in an atmosphere saturated with water, preferably a heated chamber, with the atmosphere therein having such a temperature as to induce prompt hardening of the slurry or coating. It has been found that some hydraulic cements will not properly harden in saturated atmospheres having a temperature below 65° F. Therefore, it is important that the saturated atmosphere have a temperature above 65° F. Thus, it will be seen that as much of the water as originally used in the fluid slurry mixture is retained in the coating, until the water disappears as a result of hardening in a saturated atmosphere to inhibit loss by evaporation.

It has also been found that instead of placing the coated surface or shingles in a horizontal plane, more satisfactory results are obtained by inclining the same at a small angle with the vertical, preferably at an angle of about 15 degrees, with the coated surface being faced downwardly so that vertically descending droplets of water will not be disposed on the coated surface. It is important that precautions be taken throughout the coating and hardening to prevent loss of water.

If, instead of a smooth surface, it is desired to have one coated with mineral granules, a further step is required. In such case a granular material is applied to the fluid slurry immediately after it has been applied to the surface being coated and while the slurry is still in a fluid condition. The granular material is sprinkled onto the slurry or coating and distributed uniformly throughout the area thereof. The thin film of oil is then applied to the coating after the granular material has been applied thereto and the surfaces being coated, or shingles, are then placed in a saturated atmosphere as heretofore explained. It has been found that surfaces or shingles so coated with mineral granules can be conveniently piled one upon the other to form a stack and then, if desired, placed in the atmosphere or a suitable chamber for the surfaces to harden. After such hardening, it was found that the granules were firmly bonded to the cement and the appearance of the surfaces was not impaired by such piling.

It has also been found that by maintaining the saturated atmosphere at a temperature of about 90° F., the length of time needed to harden the Lumnite cement coating is reduced to about four hours for smooth-surfaced shingles, and to about five hours for granule-coated surfaces or shingles. If the coated surfaces or shingles are piled, additional time is required for the temperature of the interior of the pile to be raised to the temperature of the saturated atmosphere or chamber.

As a result of my invention, it will be seen that there is provided a coating having all the primary requisites of a good coating and one that is uniform in all respects and free from any defects.

From the above description of my invention, it will be apparent that many modifications of the same may be devised within the scope thereof and all such modifications are contemplated as may fall within the scope of the appended claims.

I claim:

1. The method of applying a cement coating to a surface to be coated which includes the steps of impregnating with water the body of the material immediately below the surface to be coated, applying a fluid slurry consisting of a mixture of cement and water to the surface so as to obtain the desired thickness of coating thereon, applying a thin film of oil over said fluid slurry immediately after it has been applied so as to prevent loss of water from said slurry by evaporation, and finally exposing the coated surface to an atmosphere saturated with water with said atmosphere having a temperature for inducing prompt hardening of the slurry so as to provide a uniform hardened coating on said surface.

2. The method of applying a cement coating to a surface to be coated which includes the steps of impregnating with water the body of the material immediately below the surface to be coated, applying a fluid slurry consisting of a mixture of cement, water and a mineral coloring substance to the surface so as to obtain the desired thickness of coating thereon, applying a thin film of oil over said fluid slurry immediately after it has been applied so as to prevent loss of water from said slurry by evaporation, and finally exposing the coated surface to an atmosphere saturated with water with said atmosphere having a temperature for inducing prompt hardening of the slurry so as to provide a uniform hardened coating on said surface.

3. The method of applying a cement coating to a surface to be coated which includes the steps of impregnating with water the body of the material immediately below the surface to be coated, applying a fluid slurry consisting of a mixture of cement and water to the surface so as to obtain the desired thickness of coating thereon, applying a thin film of oil over said fluid slurry immediately after it has been applied so as to prevent loss of water from said slurry by evaporation, and finally exposing the coated surface to an atmosphere saturated with water with said atmosphere having a temperature of at least approximately 65° F., whereby the slurry is promptly hardened so as to provide a uniform hardened coating on said surface.

4. The method of applying a cement coating to a surface to be coated which includes the steps of impregnating with water the body of the material immediately below the surface to be coated, applying a fluid slurry consisting of a mixture of cement and water to the surface so as to obtain the desired thickness of coating thereon, applying a thin film of oil over said fluid slurry immediately after it has been applied so as to prevent loss of water from said slurry by evaporation, inclining the surface being coated at an angle of approximately 15 degrees to the vertical with the coated surface being faced downwardly, and finally exposing the coated surface at said angle to an atmosphere saturated with water with said atmosphere having a temperature for inducing prompt hardness of the slurry so as to provide a uniform hardened coating on said surface.

5. The method of applying a cement coating to a surface to be coated which includes the steps of impregnating with water the body of the material immediately below the surface to be coated, applying a fluid slurry consisting of a mixture of cement and water to the surface so as to obtain the desired thickness of coating thereon, applying granular material to the fluid slurry immediately after it has been applied to said surface so that the granules are uniformly distributed thereover, applying a thin film of oil over said fluid slurry immediately after the granular material has been applied so as to prevent loss of water from said slurry by evaporation, and finally exposing the coated surface to an atmosphere saturated with water with said atmosphere having a temperature for inducing prompt hardening of the slurry so as to provide a uniform hardened coating on said surface.

6. In the manufacture of shingles and the like composed of asbestos and cement, the method of producing a cement coating thereon which includes the steps of saturating the shingles with water so that the body of that portion of the shingle immediately below the surface to be coated is thoroughly impregnated, applying a fluid slurry consisting of a mixture of a hydraulic cement, gypsum and water to the surfaces of each of said shingles so as to obtain the desired thickness of coating thereon, applying a thin film of oil over said slurry after it has been applied to said shingles so as to prevent loss of water from said slurry by evaporation and to protect said slurry against the deposit of water droplets thereon and finally depositing the shingles in an atmosphere saturated with water so that the surfaces of the shingles are exposed thereto with said atmosphere having a temperature for inducing prompt hardening of the slurry so as to provide a uniform hardened coating on the surfaces of the shingles.

7. In the manufacture of shingles and the like composed of asbestos and cement, the method of producing a cement coating thereon which includes the steps of saturating the shingles with water so that the body of that portion of the shingle immediately below the surface to be coated is thoroughly impregnated, applying a fluid slurry consisting of a mixture of a hydraulic cement, gypsum and water to the surfaces of each of said shingles so as to obtain the desired thickness of coating thereon, applying a thin film of oil over said slurry after it has been applied to said shingles so as to prevent loss of water from said slurry by evaporation and to protect said slurry against the deposit of water droplets thereon and finally depositing the shingles in an atmosphere saturated with water so that the surfaces of the shingles are exposed thereto with the shingles being positioned so that they are inclined at a relatively small angle to the vertical, said atmosphere having a temperature for inducing prompt hardening of the slurry so as to provide a uniform hardened coating of the surfaces of the shingles.

8. In the manufacture of shingles and the like composed of asbestos and cement, the method of producing a cement coating thereon which includes the steps of saturating the shingles with water so that the body of that portion of the shingle immediately below the surface to be coated is thoroughly impregnated, applying a fluid slurry consising of a mixture of a hydraulic cement, gypsum and water to the surfaces of each of said shingles so as to obtain the desired thickness of coating thereon, applying a thin film of oil over said slurry after it has been applied to said shingles so as to prevent loss of water from said slurry by evaporation and to protect said slurry against the deposit of water droplets thereon, and finally depositing the shingles in an atmosphere saturated with water so that the surfaces of the shingles are exposed thereto with the shingles being positioned so that they are inclined at an angle of approximately 15 degrees to the vertical, said atmosphere having a temperature of at least approximately 65° F., whereby the slurry is promptly hardened so as to provide a uniform hardened coating on the surfaces of the shingles.

WILLIAM V. FRIEDLAENDER.